United States Patent [19]

Streicher

[11] 4,051,359

[45] Sept. 27, 1977

[54] ELECTRIC MULTIPLE FLASH ARRANGEMENT

[75] Inventor: Heinz Streicher, Grotzingen, Germany

[73] Assignee: General Electric Company, Schenectady, N.Y.

[21] Appl. No.: 697,981

[22] Filed: June 21, 1976

[30] Foreign Application Priority Data

Aug. 27, 1975 Germany .............................. 2538049

[51] Int. Cl.² .............................................. G03B 15/02
[52] U.S. Cl. ........................................ 362/4; 354/126
[58] Field of Search ....................... 354/127, 126, 148; 240/1.3

[56] References Cited

U.S. PATENT DOCUMENTS

| | | | |
|---|---|---|---|
| 3,608,451 | 9/1971 | Kelem | 240/1.3 |
| 3,937,946 | 2/1976 | Weber | 240/1.3 |
| 3,952,320 | 4/1976 | Blount | 240/1.3 |

*Primary Examiner*—Monroe H. Hayes
*Attorney, Agent, or Firm*—Norman C. Fulmer; Lawrence R. Kempton; Frank L. Neuhauser

[57] ABSTRACT

A FlipFlash type of photoflash array having a connector at each end for connecting the array to a camera in two different orientations. The flash lamps and circuit are arranged so that in each orientation of the array an upper group of lamps, relatively farther from the camera lens than a lower group of lamps, will be flashed in sequence. The circuit permits all lamps of the array to be flashed in either of the two orientations.

2 Claims, 2 Drawing Figures

ELECTRIC MULTIPLE FLASH ARRANGEMENT

BACKGROUND OF THE INVENTION

U.S. Pat. No. 3,952,320 to Richard Blount discloses an electric multiple flash arrangement comprising a housing with two groups of flash lamps which are arranged one above the other end electrically separated from each other but which emit light in the same direction, and a connector is provided at each end of the housing for contact-making insertion into a socket provided on a camera so that the lamps of the top lamp group farthest away from the camera can be ignited, one after the other, the current paths from one ignitable flash lamp to the next within each group being initially interrupted by a radiation switch and then completed by the ignition of a flash lamp and closing of said radiation switch. The lamps are connected to a circuit board which carries the sequential flashing circuitry and is provided with the connectors for attachment to a camera. In a known multiple flash arrangement of this kind, eight flash lamps are provided on the circuit board. These flash lamps are arranged in two rows of four lamps, one above the other. The flash lamps are electrically connected in such a way that first the upper four can be ignited. Only when the arrangement has been turned through 180° and the other connector inserted into a socket on a camera can the four lower flash lamps — now the upper ones — be ignited. The purpose of this is to have the flashing lamps relatively high above the camera lens, to eliminate or reduce the undesirable "red-eye" effect. When the top four flash lamps have been ignited, no further flash will be fired on releases of the camera shutter unless the user remembers to turn the arrangement through 180° and insert it again into the camera socket. Faulty exposure of the film is the unfortunate result if he forgets.

SUMMARY OF THE INVENTION

It is an object of the invention to so design an electric multiple flash arrangement that faulty exposure cannot occur even if the multiple flash arrangement is not changed around as it should be.

The invention comprises, briefly and in a preferred embodiment, a multiple flash lamp array having a connector at each end thereof for connecting the array to a camera in two different orientations. The flash lamps and a firing circuit are arranged on a circuit board so that in each orientation of the array on a camera an upper group of lamps will be flashed, one at a time, when taking flash pictures. After the upper group of lamps have been flashed, the array can be turned around and connected to the camera in the other orientation so that a second group of lamps in the array will then constitute the upper group of flashable lamps. By thus flashing lamps of the upper group, which are spaced relatively far above the camera lens, the undesirable "red-eye" effect is eliminated or reduced. In accordance with the invention, circuitry is provided on the circuit board so that all of the flash lamps in the array (including the lower group of lamps) can be flashed, one at a time, in either of the two orientations of the array on the camera. Thus, if a person forgets to turn the array around after flashing all lamps of the upper group, his next flash pictures will produce flashing of lamps of the lower group, and flash illumination will be obtained, although at greater risk of getting the "red-eye" effect, i.e., of a person's pupils having a red or pink color in the pictures due to flash illumination of the corneas.

In a specific embodiment, radiaton switches are provided adjacent to the last-to-be-flashed lamp of each group, and function, when the last lamp of a group is flashed, to connect the circuitry of the other group of lamps into the active firing circuit.

DESCRIPTION OF THE PREFERRED EMBODIMENT

Figure 1:
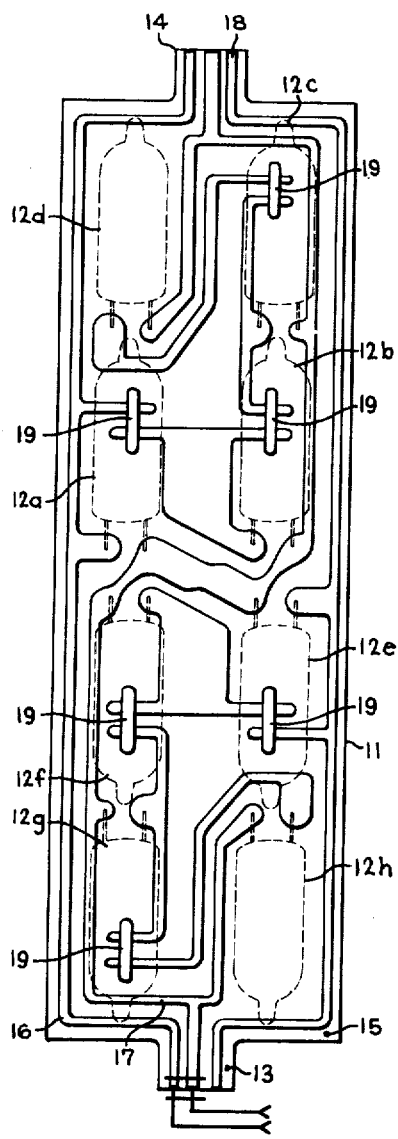
FIG. 1 is an illustration of a known multiple flash arrangement of lamps and a circuit board.

The arrangement of FIG. 1 is generally the same as is disclosed in the above-reference Blount patent, and comprises a housing 11 (not shown in detail) in which four flash lamps 12 are arranged in each of two rows, one above the other. The reflectors, not shown, for the flash lamps are so positioned that all eight flash lamps radiate their light through the transparent front of the housing 11 in the same direction.

Connectors 13 and 14 are provided at either end of the housing 11, having an associated socket (not illustrated) in a camera. This socket has contacts for conductor lines 16, 17 and 18 at the connectors 13 and 14, and is connected to a power source in the camera via a sync switch. The conductor lines 16, 17 and 18 provided on a printed circuit board 15 terminate on the connectors 13 and 14. Four flash lamps 12a, 12b, 12c and 12d are connected in parallel between the conductor lines 16 and 17. When the connector 13 is in a camera socket and the housing stands upright, these lamps form an upper lamp group. The lower group of four flash lamps 12e, 12f, 12g and 12h is located between the conductor lines 17 and 18 and can only be fired when the housing 11 has been turned around and the connector 14 inserted into a camera socket.

The conductor lines 16 and 18 are interrupted by radiation switches 19 to prevent the flash lamps in a group from all being fired together on release of the camera shutter. These switches 19 are each arranged in the region of a flash lamp so that the heat released when the flash lamp is fired fuses the respective switch, thus establishing the current path to the next flash lamp.

With this known multiple flash arrangement, faulty exposure can occur if the arrangement is not inserted into a camera socket with its other connector 14 when the fourth and last flash lamp of the top group has been fired.

Figure 2:
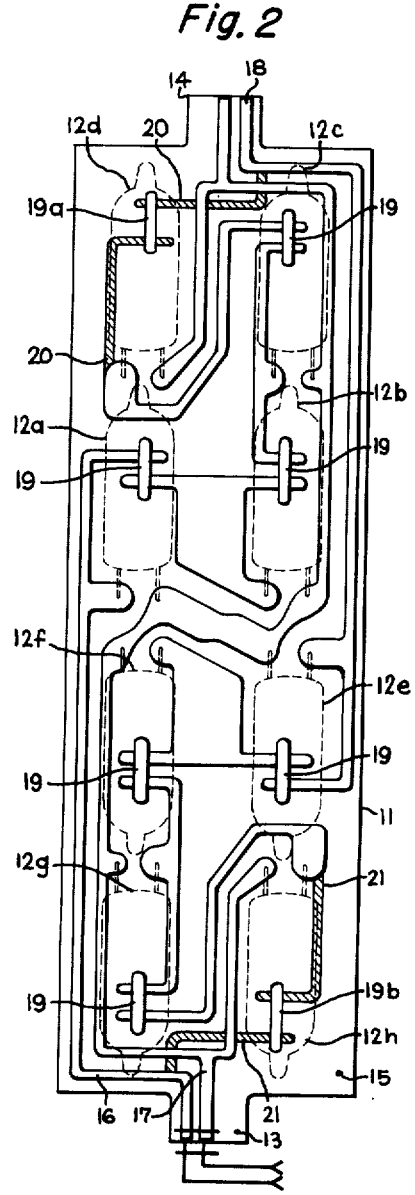
FIG. 2 is an illustration of a multiple flash arrangement according to the invention.

This inadequacy is overcome if the multiple flash arrangement according to the invention is used. As can be seen from FIG. 2, the construction of the arrangement according to the invention is essentially the same as that of the arrangement described with reference to FIG. 1. The distinction is that the conductor line 16 which starts in the connector 13 does not continue to the connector 14 but terminates at the switch 19 for the flash lamp 12a. Similarly, the conductor line 18 starting at the connector 14 does not continue to the connector 13 but terminates at the switch 19 for the flash lamp 12e.

In place of the shortened conductor lines 16 and 18, connecting lines 20 and 21 are provided between the last flash lamp, 12d and 12h respectively, to be fired in each group and the conductor lines 18 and 16 respectively of the other group of lamps. Each of these connecting lines 20 and 21 contains a radiation switch, 19a and 19b, located in the region of the last flash lamp, 12d and 12h, to be fired in each group. Of course, the connecting lines 20 and 21 must be insulated from the line 17 where they cross over.

When, for instance, the flash lamp 12d is fired, the switch 19a fuses, thus connecting the current path between the conductor lines 16 and 18 which had previously been interrupted. As a result, the first flash lamp 12e of the lower group — arranged between the conductor lines 18 and 17 — can be fired without the housing 11 having been turned around and the connector 14 inserted into a camera socket.

The camera user can leave the multiple flash arrangement with the connector 13 inserted in the camera socket and take further flash photographs igniting the flash lamps 12f, 12g and 12h. He can also, however, insert the other connector 14 of the multiple flash arrangement into the camera socket, even if some of the flash lamps of the lower group have already been fired. What was previously the lower group then becomes the upper group. On the ignition of flash lamp 12e, the switch 19 associated with this lamp had already completed the current path to the next flash lamp 12f, and so when the multiple flash arrangement has been changed around, the flash lamp 12f will be fired.

The firing of the flash lamps from the upper group has the advantage that the distance between the flash lamp fired and the camera lens is greater, the so-called "red-eye effect" thus being avoided when photographs of people are taken.

While a preferred embodiment of the invention has been shown and described, various other embodiments and modifications thereof will become apparent to persons skilled in the art, and will fall within the scope of the invention as defined in the following claims.

What I claim as new and desired to secure by Letters Patent of the U.S. is:

1. A multiple electric flash lamp array comprising a unitary structure having definable first and second regions, a first group of flash lamps in said first region and a second group of flash lamps in said second region, first and second electrical connector means forming a part of said structure and disposed in or adjacent to said first and second regions respectively, said first group of lamps being separated from said second connector means by said second region and said second group of lamps being separated from said first connector means by said first region, a first flash sequencing circuit connected between said second connector means and the lamps of said first group for causing them to flash in sequence from first to last in response to flash signals applied to said second connector means, a second flash sequencing circuit connected between said first connector means and the lamps of said second group for causing them to flash in sequence from first to last in response to flash signals applied to said first connector means, wherein the improvement comprises a first switching circuit for connecting flash signals applied to said first connector means to said second flash sequencing circuit after said last-to-flash lamp of the first group has been flashed, and a second switching circuit for connecting flash signals applied to said second connector means to said first flash sequencing circuit after said last-to-flash lamp of the second group has been flashed.

2. A flash array as claimed in claim 1, in which said first switching circuit comprises a first radiation switch positioned to receive radiation from said last-to-flash lamp of the first group and adapted in response thereto to close a circuit between said last-mentioned lamp and the first-to-be-flashed lamp of said second group of lamps, and in which said second switching circuit comprises a second radiation switch positioned to receive radiation from said last-to-flash lamp of the second group and adapted in response thereto to close a circuit between said last-mentioned lamp and the first-to-be-flashed lamp of said first group of lamps.

* * * * *